(12) United States Patent
Joseph (10) Patent No.: US 9,008,865 B2
(45) Date of Patent: Apr. 14, 2015

(54) METHOD AND DEVICE FOR MANAGING, PROCESSING AND MONITORING PARAMETERS USED ON BOARD AIRCRAFT

(75) Inventor: Olivier Joseph, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 679 days.

(21) Appl. No.: 12/602,793

(22) PCT Filed: May 29, 2008

(86) PCT No.: PCT/FR2008/050951
§ 371 (c)(1),
(2), (4) Date: Dec. 3, 2009

(87) PCT Pub. No.: WO2008/152315
PCT Pub. Date: Dec. 18, 2008

(65) Prior Publication Data
US 2010/0179710 A1    Jul. 15, 2010

(30) Foreign Application Priority Data
Jun. 5, 2007 (FR) ................... 07 04020

(51) Int. Cl.
G06F 7/00 (2006.01)
G06F 17/00 (2006.01)
G06F 17/30 (2006.01)
G05B 23/02 (2006.01)
G05B 15/02 (2006.01)

(52) U.S. Cl.
CPC ............ G05B 23/0221 (2013.01); G05B 15/02 (2013.01)

(58) Field of Classification Search
USPC ........................................... 701/3
See application file for complete search history.

(56) References Cited

U.S. PATENT DOCUMENTS

| | | | | |
|---|---|---|---|---|
| 4,675,675 A * | 6/1987 | Corwin et al. | ................ | 340/945 |
| 4,788,531 A * | 11/1988 | Corwin et al. | ................ | 340/945 |
| 4,943,919 A * | 7/1990 | Aslin et al. | ........................ | 701/3 |
| 5,161,158 A * | 11/1992 | Chakravarty et al. | ........... | 714/26 |
| 6,219,626 B1 * | 4/2001 | Steinmetz et al. | ............ | 702/183 |
| H002040 H * | 8/2002 | Reiser | ............................. | 701/12 |
| 6,523,139 B1 * | 2/2003 | Banning et al. | ................ | 714/43 |
| 6,816,762 B2 * | 11/2004 | Hensey et al. | ............... | 701/32.6 |
| 8,682,586 B1 * | 3/2014 | Selman et al. | .................... | 702/9 |
| 2003/0030564 A1 * | 2/2003 | Boyce et al. | .................... | 340/679 |
| 2003/0109973 A1 * | 6/2003 | Hensey et al. | ................. | 701/35 |
| 2004/0039499 A1 * | 2/2004 | Felke et al. | ..................... | 701/29 |
| 2004/0172408 A1 * | 9/2004 | Klosterhalfen et al. | .. | 707/103 R |
| 2006/0074857 A1 * | 4/2006 | Etzold et al. | ..................... | 707/3 |
| 2006/0229799 A1 * | 10/2006 | Nimmo et al. | ................ | 701/117 |
| 2007/0032922 A1 * | 2/2007 | Gvillo | ............................... | 701/3 |
| 2008/0215460 A1 * | 9/2008 | McKibben | ..................... | 705/28 |

FOREIGN PATENT DOCUMENTS

EP    1 280 316    1/2003

* cited by examiner

Primary Examiner — Calvin Cheung
Assistant Examiner — Krishnan Ramesh
(74) Attorney, Agent, or Firm — Oblon, McClelland, Maier & Neustadt, L.L.P.

(57) ABSTRACT

A standardized identification code is used to identify each flight parameter used on board an aircraft and to provide some of its characteristic information. Descriptive complementary information is advantageously associated with the identification codes to form parameter identification maps stored, for example, in a shared database. The parameter identification codes may in particular be used to perform certain checks when parameter values are received. These checks make it possible to process only the monitored parameter values and to generate alerts if an inconsistency is detected.

38 Claims, 6 Drawing Sheets

METHOD AND DEVICE FOR MANAGING, PROCESSING AND MONITORING PARAMETERS USED ON BOARD AIRCRAFT

BACKGROUND OF THE INVENTION

This invention relates to the management of data characteristic of aircraft and more particularly to a method and a device for management, processing and control of the parameters used on board aircraft, commonly called avionic parameters or flight parameters.

FIELD OF THE INVENTION

Present-day on-board electronic equipment items and avionic systems are more and more complex and more and more effective, integrating numerous advanced functionalities and multiplying the interconnections among the systems. Consequently, the volume of exchange of information items is increasing.

DISCUSSION OF THE BACKGROUND

These highly integrated on-board avionic systems, based on hardware components, software components and a shared communication network, are multiplying and becoming more complex at the rate of an ongoing technological evolution, not only opening up new prospects for the aircraft manufacturers but also bringing about new constraints. The advent of these new technologies, of these new designs and of these new avionic systems consequently necessitates an increased vigilance and the implementation of efficient engineering methods and means, involving the use of appropriate and optimized tools in order to master the complexity of these systems, their development and their operation.

In this technically advanced and increasingly complex context, the on-board computers or application software such as the navigation, piloting, flight management, communication, maintenance, recording and control and display (cockpit and/or cabin) systems, as well as the ground systems such as the flight analysis, programming, recording and calculation tools use an increasing number of avionic parameters. The quantity of information having to be processed is constantly increasing, not only in volume but also in form, reflecting this ever-growing complexity and accordingly the need to optimize the management and control thereof, in a safe and efficient manner.

It also is necessary to adapt to this new operational and economic context in which rapid access to information is essential and in which the needs for quality, reliability, confidentiality and security are preponderant elements on board aircraft.

Information items relating to the avionic parameters often are essential, in the same way as the computer processing operations performed on the corresponding data, for the security of the aircraft and the operational efficiency. For example, information items relating to flight management parameters, engine parameters, performance parameters, maintenance parameters and prescribed recording parameters generally are considered as essential.

These information items are used by a large number of users, in a multitude of areas connected with the aeronautics industry and with air transport. The avionic parameters and the information items relating thereto are indispensable throughout the life cycle of the aircraft, from the standpoint of the aircraft manufacturers for the significant steps of systems development, in particular during the phases of specification and design, integration and validation and for maintenance and support activities, as well as from the standpoint of the operators in the context of their aircraft operation activities.

Despite the importance of the information items relating to the avionic parameters, the latter are not easily or directly accessible to the engineers working on these aircraft or to any other individual having need for these information items.

Furthermore, the use of new technologies, the introduction of highly integrated systems architecture based on a shared network that brings about important and frequent exchanges of data, as well as software that can be programmed by the users give rise to new threats to the integrity of the systems and the security of the aircraft. It therefore is necessary to implement appropriate means or mechanisms making it possible to detect, isolate, eliminate or reduce the risks of intrusions and infections and to ensure the confidentiality of the exchanged information items.

SUMMARY OF THE INVENTION

The invention falls within this context and makes it possible to resolve at least one of the problems set forth above.

The invention thus has as an object a method for management of at least one characteristic of at least one parameter used on board an aerodynamic vehicle, comprising the following steps, receiving an identifier of the said at least one parameter;

receiving the said at least one characteristic of the said at least one parameter;

formulating the said at least one characteristic of the said at least one parameter according to a predetermined format; and, creating a code for identification of the said at least one parameter comprising the said identifier and the said at least one characteristic.

In this way the invention makes it possible to standardize and harmonize the identification of parameters of aerodynamic vehicles. It also makes it possible to build up the acquired knowledge and to access rapidly the information relating to the avionic parameters, throughout the life cycle of the aerodynamic vehicles (help in design, maintenance, support, programming for recording, restoration, analysis of flight data). The invention further makes it possible to facilitate and optimize the sharing and consultation of these information items.

Advantageously, the method further comprises the following steps, receiving at least one additional information item descriptive of the said at least one parameter; and, associating the said at least one complementary descriptive information item with the said identification code.

According to a specific embodiment, the said at least one characteristic of the said at least one parameter comprises information items relating to the source, recording, display, or level of confidentiality of the value of the said at least one parameter.

The invention also has as an object a method for processing at least one value of at least one parameter used on board an aerodynamic vehicle, this method comprising the following steps, receiving a code for identification of the said at least one parameter, the said identification code being created according to the management method described above;

receiving the said at least one value associated with the said at least one parameter;

verifying the data of the said identification code received according to predetermined reference data; and, if the data of the said received identification code are verified, processing of the said at least one received value.

Advantageously the method further comprises a step of transmitting an information item relating to the said at least one parameter if the data of the said received identification code are not verified.

The invention also has as an object a method for control of at least one parameter used on board an aerodynamic vehicle, this method being characterized in that it comprises the following steps, receiving at least one information item relating to the said at least one parameter, the said information item being transmitted by the method for processing at least one value of the said at least one parameter described above; and generating an alarm.

In this way the invention makes it possible to contribute to the security of aerodynamic vehicles by ensuring the accuracy of the information items and the provision of appropriate management and control means.

The invention also has as an object a device comprising means adapted for the implementation of each of the steps of the methods described above, as well as such a device integrated into an aircraft.

The invention also has as an object a computer program comprising instructions adapted for the implementation of each of the steps of the methods described above, as well as a means for storing information items, removable or otherwise, partially or totally readable by a computer or microprocessor comprising computer program code instructions for the execution of each of the steps of the methods described above.

BRIEF DESCRIPTION OF THE DRAWINGS

Other advantages, purposes and characteristics of this invention become apparent from the detailed description that follows, presented by way of non-limitative example, with reference to the attached drawings in which:

FIG. 2, consisting of FIGS. 2a and 2b, illustrates a code for identification of a parameter and a card for identification of a parameter, respectively;

FIG. 3, consisting of FIGS. 3a, 3b, 3c, 3d, 3e and 3f, shows an example of an ergonomic graphical interface used to consult or edit the information items relating to a parameter;

DESCRIPTION OF THE PREFERRED EMBODIMENTS

The avionic parameters used on board aircraft can be characterized by a set of information items, basic or more or less detailed and pertinent, such as the name and the description of the parameters, their operating value range, their resolution, their precision, their type or unit of measure.

According to the invention, these information items are used and combined, in particular with indications of confidentiality linked to these information items, to create cards for identification of these parameters themselves comprising an identification code. These identification cards preferably are grouped in a centralized database. Such a database can be consulted by a large number of users with varying skills, in different areas of activities, needing to access these information items, preferably after authentication and verification of access rights. The database can be accessible by several users simultaneously, from time to time or continuously, that is, twenty-four hours a day, seven days a week.

The card for identification of a parameter thus has as an object to collect as much pertinent information as possible on this parameter according to a unique, standard and condensed format, usable by individuals of different occupations and skills, and accordingly, for diverse needs and usages. Among the potential users there can be found systems designers, testers, quality or customer-support engineers, specialists in certification or incident/accident investigations and maintenance operators.

The codes for identification and the cards for identification of parameters must be able to be used for diverse and varied purposes, for example for the processing, recording, display of the values of these parameters or the preparation of the technical documentation (for example development documents, maintenance manuals or training manuals), in the context of the activities of aircraft design, maintenance and support or else even in the area of flight analysis and safety.

The identification codes can be used for an informative purpose in order to determine certain characteristics of a parameter and/or for a monitoring purpose in order to control access, flows or routing of parameters within avionic systems and aircraft in general. This monitoring can be automatic or manual, for example to check whether or not the presence of a parameter in a specific system is authorized, to filter or redirect one or more parameters in the case of a degraded functioning or when a specific problem occurs, to trace exchanges or to authorize communications. Since the values of these parameters generally are transmitted on so-called "open" networks, that is, unsecured and used for the transmission of other data, the codes for identification of parameters make it possible to provide a means for achieving a level of security sufficing to control the values of the parameters and their transmissions.

According to the invention, the format of the codes for identification and the cards for identification of the parameters takes into account possible changes of the information items characteristic of the parameters, that is, of the needs linked to these parameters.

The information items contained in an identification card characterize the parameter. These information items are, for example, the following information items, standard information items of a general nature concerning the parameter;

the identifier of the equipment at the origin of the parameter (for example the computers, modules or applications);

a reference to the family or to the model of aircraft affected by this parameter;

the ATA (Air Transport Association) section involved corresponding to this parameter (the ATA is an international standardization agency having established a classification by ATA sections used to identify the functional parts of an aircraft in standardized manner);

the category of the parameter (for example the magnitude and the unit of measure used);

the state indicators, the destination (number and designation of the computers receiving and using the parameter);

the recording state specifying whether the parameter is recorded in the flight recorder commonly called "black box" or DFDR (Digital Flight Data Recorder);

the display state indicating whether the parameter is displayed intended for the pilot in the cockpit and/or in the cabin intended for the passengers and on which screens; and, the security state indicating the nature of the parameter according to specific criteria such as the sensitivity of the datum or the confidential nature of the parameter (for example navigation or position data, performance data specific to the operator or to the aircraft or sensitive data of the company); and other significant information items that can characterize the parameter or having an acknowledged importance to be pointed out.

Figure 1:
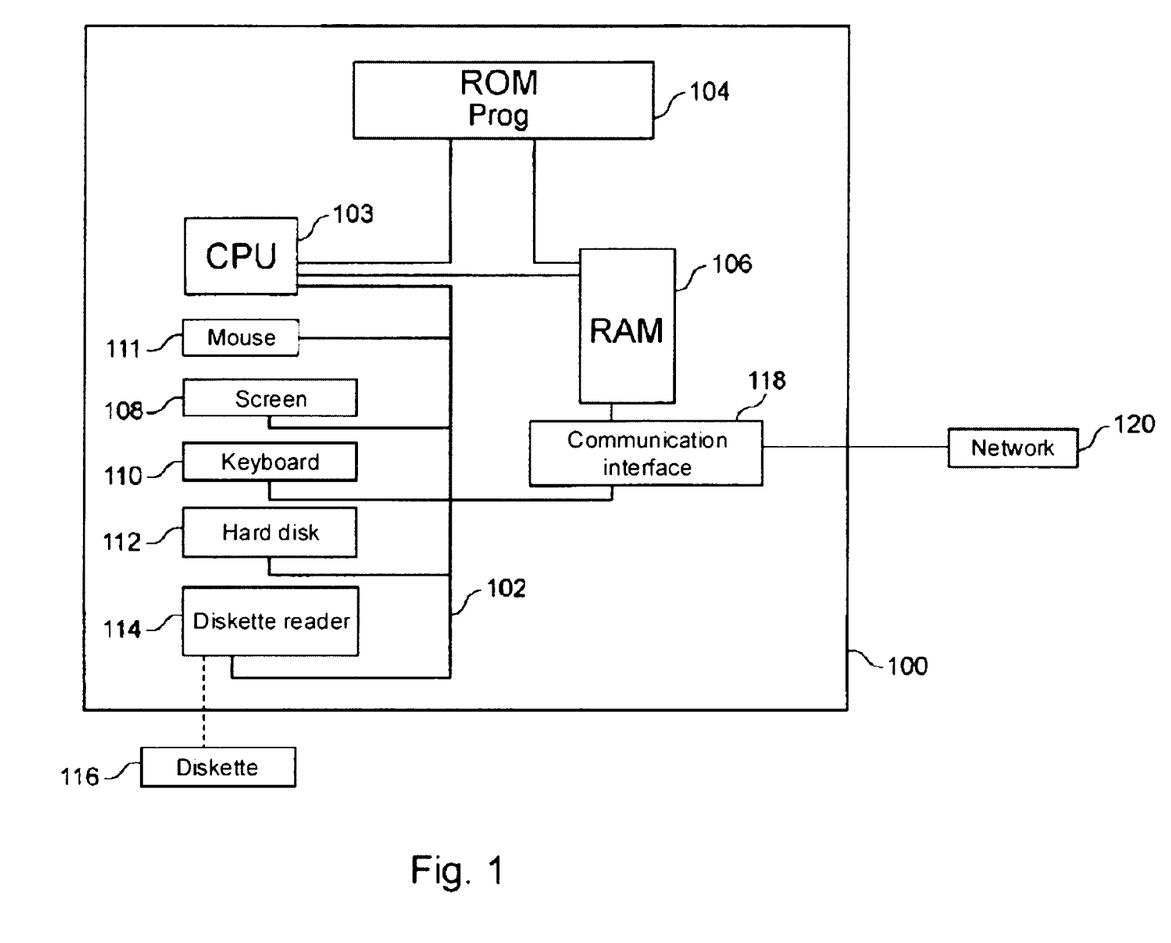
FIG. 1 shows an example of an apparatus making it possible to implement the invention.

FIG. 1 illustrates an example of apparatus 100 adapted for implementing the invention, in part or in its entirety, such as a microcomputer or a workstation.

Apparatus 100 preferably comprises a communication bus 102 to which there are connected, a central processing unit 103 such as a microprocessor;

a read-only memory 104 or Read Only Memory (ROM), that can comprise one or more programs "Prog";

a random-access memory 106 or Random Access Memory (RAM), comprising registers adapted for storing in memory variables and parameters created and modified during execution of the aforementioned programs; and a communication interface 118 connected to a distributed communication network 120, for example the Internet network, the interface being capable of transmitting and receiving data.

Apparatus 100 optionally can have one, several or all of the following devices:

a screen 108 for displaying data and/or serving as a graphical interface with the user who will be able to interact with the programs according to the invention, with the aid of a keyboard 110 or any other means such as a pointing device, as, for example, a mouse 111 or a light pen, a touch-sensitive screen or a remote control;

a hard disk 112 that can comprise programs and/or data, in particular data processed or to be processed according to the invention;

a diskette reader 114 adapted for receiving a diskette 116 and for reading or writing therein data processed or to be processed according to the invention; and, a memory card reader (not shown) adapted for reading or writing data therein, in particular data processed or to be processed according to the invention.

The communication bus allows communication and interoperability among the different components included in apparatus 100 or connected thereto. The depiction of the bus is not limitative and, in particular, the central unit is capable of communicating instructions to any component of apparatus 100, directly or through another component of apparatus 100.

The executable code of the program or programs making it possible for apparatus 100 to implement the processes according to the invention can be stored, for example, in hard disk 112 or in read-only memory 104.

According to one variant, diskette 116 can contain data as well as the executable code of the aforementioned programs which, once read by apparatus 100, can be stored in hard disk 112.

Alternatively, the executable code of the programs can be received through communication network 120, via interface 118, to be stored in a manner identical to that described above.

The diskettes can be replaced by any information medium such as, for example, a compact disk (CR-ROM) or a memory card. Generally speaking, an information storage means, readable by a computer or by a microprocessor, integrated or not into the apparatus, possibly removable, is suitable for storing in memory one or more programs the execution of which allows implementation of the method according to the invention.

More generally, the program or programs will be able to be loaded into one of the storage means of apparatus 100 before being executed.

Central unit 103 controls the execution of the instructions or portions of software code for the program or programs according to the invention, which instructions are stored in hard disk 112, in read-only memory 104 or in the other aforementioned storage components. During boot-up, the program or programs stored in a non-volatile, for example hard disk 112 or read-only memory 104, are transferred into random-access memory 106 (RAM), which then contains the executable code of the program or programs according to the invention, as well as the registers for storing in memory the variables and parameters necessary for implementation of the invention.

It should be noted that the apparatus comprising the device according to the invention also can be a programmed apparatus. The instructions for the program or programs implementing the invention can, for example, be implemented in a programmable or specific integrated circuit (Application-Specific Integrated Circuit, ASIC).

An identification card thus can be considered as a specific structure comprising in particular, a code for identification of the parameter; and, a set of information items characteristic of the parameter.

The codes for identification of the parameters are unique, each parameter possessing its own identification code making it possible to identify it in an exclusive and unequivocal manner. Such codes can be used as reference by the users, by the applications that use them or to create links between the identification cards or between the parameters themselves (for example by creating dynamic links between the parameters).

Figure 2A:
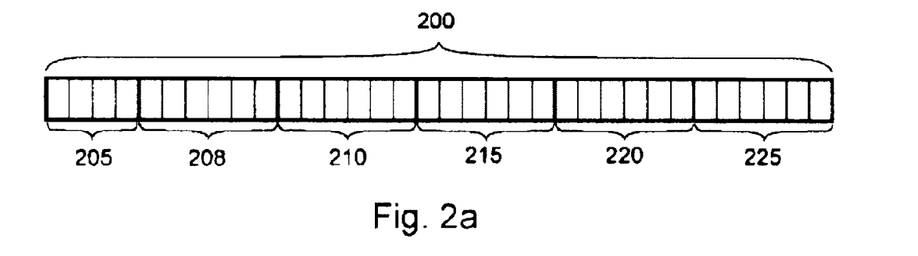

As illustrated on FIG. 2a, a parameter identification code 200 advantageously is composed of several fields. Here, identification code 200 for a parameter comprises a standard identifier field 205, a detailed identifier field 208, a recording field 210, a display field 215, a security field 220 and a version field 225. Each field preferably has a set, predetermined length, composed of figures and/or alphanumeric characters.

Standard identifier field 205 constitutes the first identification level and has as an object to generally identify the parameter with a minimum of data (standard identification information). These data preferably are to be sufficiently generic to allow a certain standardization among the aircraft.

By way of illustration, the first character of standard identifier field 205 is a "P" (Parameter) in order to rapidly identify that the data that follow relate to an avionic parameter. The two following characters correspond to the ATA section to which the parameter belongs (more precisely the ATA section to which the transmitting system or equipment for this parameter belongs). This information can be coded on more characters, for example 3 or 4, and in this way specify the source system or equipment at the origin of the parameter in accordance with the standardized ATA description 100 of the aircraft in question.

The three following characters here are used to code the category of the parameter in the form Cxx where xx corresponds to the number of the category involved. For example, C06 can be used for speed parameters, C25 for temperature parameters, C10 for weight parameters and C05 for frequency parameters. This classification by category preferably is the most standard possible (constructed on the basis of the classification of the international unit of measure SI, commonly called "metric system") and adapted for the realm of aeronautics.

These data can be supplemented by other complementary fields such as identification of the equipment or of the system at the origin of the parameter, the type of aircraft in question or the engine type involved.

By way of example, the code P34C06ADIRU1S20RR represents the premises of the code for identification of a parameter "P," belonging to the ATA section 34 (Navigation), of category C06 (speed), the source of which is the ADIRU1 (Air Data and Inertial Reference Unit) computer, referring to an S20 type aircraft (here an Airbus A320, Airbus and A320 are trademarks) equipped with a type RR engine (Rolls-Royce, Rolls-Royce is a trademark).

Detailed identifier field 208, constituting the second level of identification, has as an object to identify the parameter precisely. These data must be sufficiently detailed and adapted to ensure the uniqueness of the parameter in its category.

By way of illustration, this field can be made up of a combination or a judicious codification of detailed technical information items relating to the parameter which, as a complement to standard identifier field 205, make it possible to identify it exclusively. This field can consist, for example, of the combination and/or the codification of information items inherent to the parameter itself (such as the type of parameter) or specific to its environment (with reference to the format and/or the communication protocol used such as the ARINC429 label, bus, virtual AFDX line (Avionics Full Duplex Network) or UDP port (User Datagram Protocol) number.)

Recording field 210 makes it possible to provide information items relating to the recording state of the parameter in the flight recorder (DFDR).

According to a specific embodiment, the first character of the recording field is an "R" (Recording) making it possible to identify this field. This character is followed by a second binary character, for example 0 or 1, which indicates whether or not this parameter is recorded in the flight recorder and a third binary character, for example "M" or "D" (Mandatory and Documentary) which indicates that it is a matter of a prescribed mandatory so-called Mandatory parameter (that is, a parameter for which recording derives from a prescribed requirement on the part of the competent Authorities) or Documentary, so-called Documentary (that is, a parameter recorded on a documentary basis, for which recording is not specifically required by the Authorities but recommended because it is useful for analysis).

These data can be supplemented by other indications to include the partial or complete DFDR number of the recorded DFDR parameter (for example M01, D20 or M01 a01, D20a03) and to specify in particular whether the parameter is a filtered or unfiltered parameter, or else even whether a mnemonic or a specific abbreviation possibly is associated therewith.

By way of illustration, the code R1M indicates that the parameter is recorded in the flight recorder (R1) and that it concerns a parameter referenced as being mandatory (M).

Display field 215 indicates whether or not the parameter is displayed in the aircraft and, if need be, on which screen it is displayed. According to a specific embodiment, the first character of the recording field is a "D" (Display) making it possible to identify this field. This character is followed by one or more characters that indicate the screens on which this parameter is displayed or can be displayed (for example navigation screen ND (Navigation Display), piloting screen PFD (Primary Flight Display), head up collimator HUD (Head Up Display), alarm screen or terminal OIT/OMT (Onboard Information Terminal/Onboard Maintenance Terminal)).

Security field 220 is used to specify whether or not the parameter is confidential and whether it is exported or can be exported, for example to the ground. According to a specific embodiment, the first character of the recording field is an "S" (Security) making it possible to identify this field. This character is followed by one or more characters that indicate whether or not this parameter is confidential, whether or not it can be recorded and whether or not it can be transmitted to the ground. For example, restrictions are imposed on flight trial (EV) parameters and maintenance parameters. This field also can include an indication for specifying the associated level of confidentiality.

Version field 225 determines the version of the parameter. According to a specific embodiment, the first character of the recording field is a "V" (Version) making it possible to identify this field. This character is followed by one or more characters that indicate the version in order to manage changes.

Figure 2B:
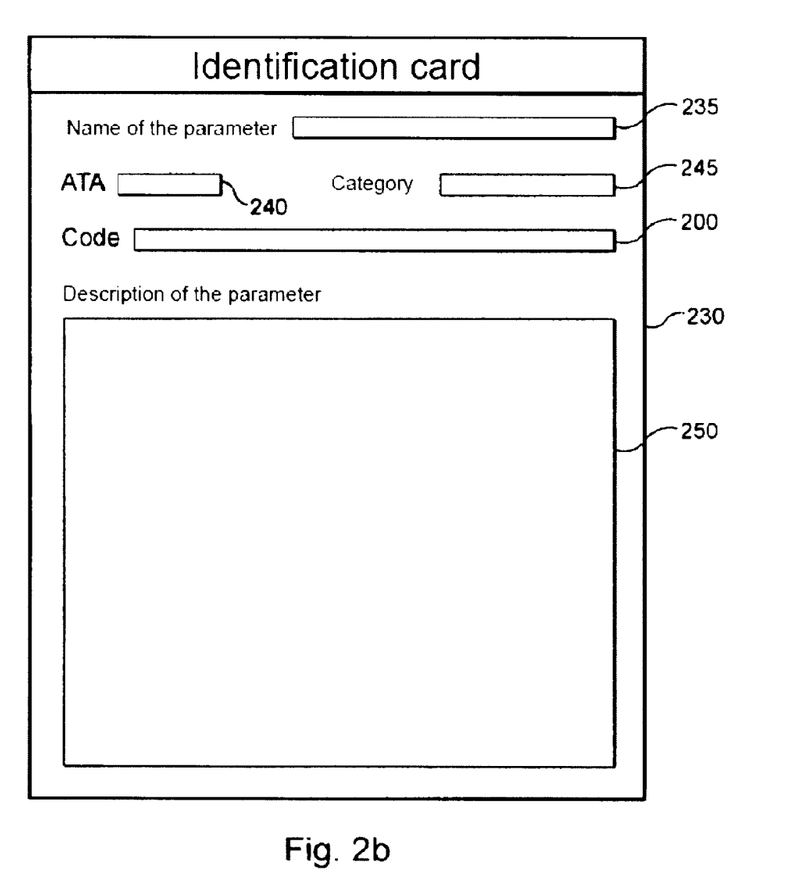

FIG. 2b illustrates an exemplary representation 230 of a card for identification of a parameter that here includes the name 235 of the parameter, the ATA section 240 concerned, the category 245, the identification code 200 and the description 250. The information items displayed on representation 230 derive from the code for identification of the parameter and from information items characteristic of the parameter.

According to a specific embodiment, the data of description 250 are encrypted so that they are accessible only to holders of the corresponding decryption key. The encryption and decryption mechanisms used advantageously are standard mechanisms.

The storing in memory of cards for identification of aircraft parameters in a database, preferably a centralized database, makes it possible to improve the sharing of information items as well as to simplify and control access to these information items. In addition to a function of protection of data relating to the parameters, the database of cards for identification of parameters advantageously offers standard database functions such as rapid search, sorting, comparison, filtering and import/export functions.

The database comprises an interface for entry and editing of information items relating to the parameters as well as a standard interface for utilization of the multi-user data access function.

Furthermore, the database can interface with other existing databases or tools in order to optimize the use thereof.

FIG. 3, consisting of FIGS. 3a, 3b, 3c, 3d, 3e and 3f, shows an example of a graphical interface for the consultation or the entry of information items relating to a parameter. As illustrated on FIG. 3a, graphical interface 300 comprises standard menus 302, here the menus File, Edit, View, Document, Tools, Window and Help, the name 304 of the edited parameter as well as a view in the form of tabs making it possible to access the information items relating to the edited parameter.

Figure 3A:
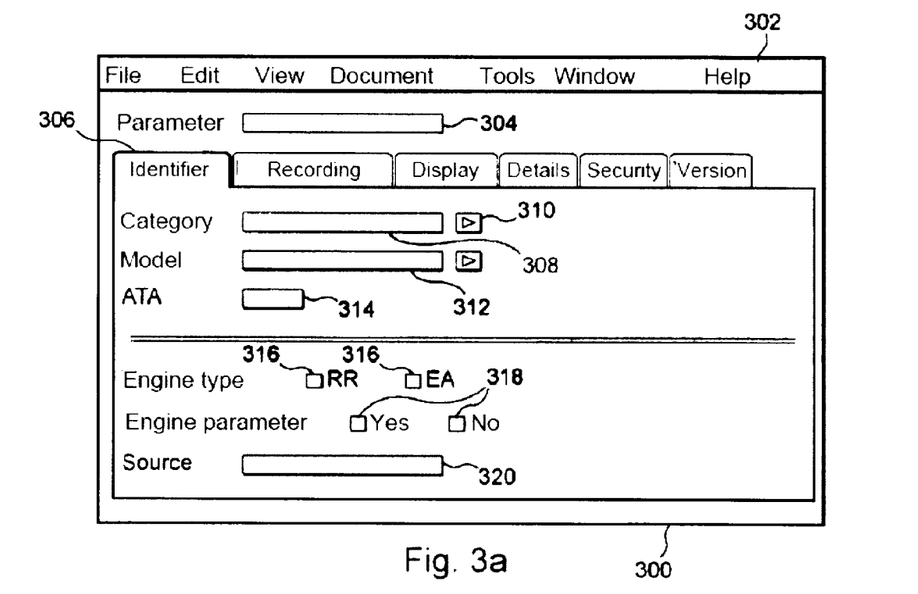

The tabs here concern information items relating to identification (tab 306), recording (tab 322), display (tab 328), certain details (tab 338), security (tab 352) and version (tab 358). It should be noted that certain of these information items are those presented previously.

Tab 306 concerning general identification information items comprises several fields that can be edited, including,
the category 308 of the parameter the selection of which can be facilitated by a by a pull-down and/or pop-up type menu 310 offering a choice of possible selections (since this method of selection is known to the individual skilled in the art, reference is not systematically made thereto in the remainder of the description);

the model 312 of the aircraft affected by the parameter (the selection of this information item also can be facilitated by a pull-down and/or pop-up type menu);

the ATA section 314 concerned;

the "passengers" or "cargo" version of the aircraft concerned (not shown);

the type of engine 316 of the aircraft concerned (in the context of parameter editing, it is possible here to select several types of engine the selection of which can be accomplished, for example, with the aid of a box to be checked off);

an engine parameter identification 318 indicating whether or not an engine parameter is involved; and, the source 320, that is, the reference of the transmitting device or devices at the origin of the edited parameter.

Figure 3B:
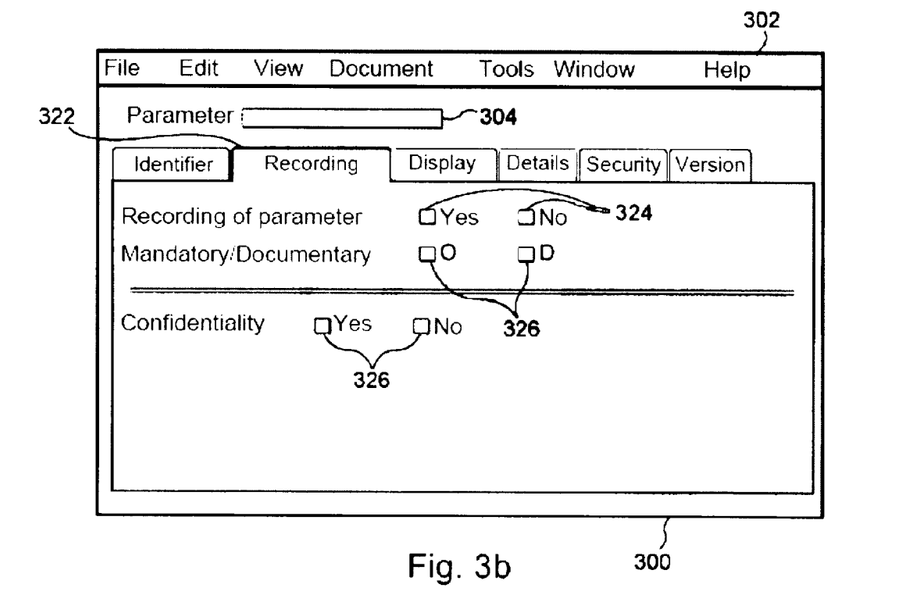

Similarly, FIG. 3*b* illustrates an example of a graphical interface for the consultation of information items linked to the recording of the parameter in the flight recorder, grouped under tab 322.

Tab 322 concerning recording information items comprises several fields, including, an information item 324 of general nature indicating whether or not the parameter is recorded in the flight recorder and, if need be, the conditions under which it is recorded (a pop-up type menu can be used to display these conditions, such that the logics and characteristics of recording or a link to the referenced files or tools containing these information items);

an information item 326 indicating whether a prescribed or documentary parameter is involved;

an indication 326 linked to the confidentiality of recording of the parameter, that is, whether it involves a parameter identified as sensitive, the recording of which in the flight recorder is subject to conditions (for example position or flight path data concerning military aircraft); and, other pertinent information items specific to recording and relating to the type of aircraft concerned and to the recording system installed.

Figure 3C:
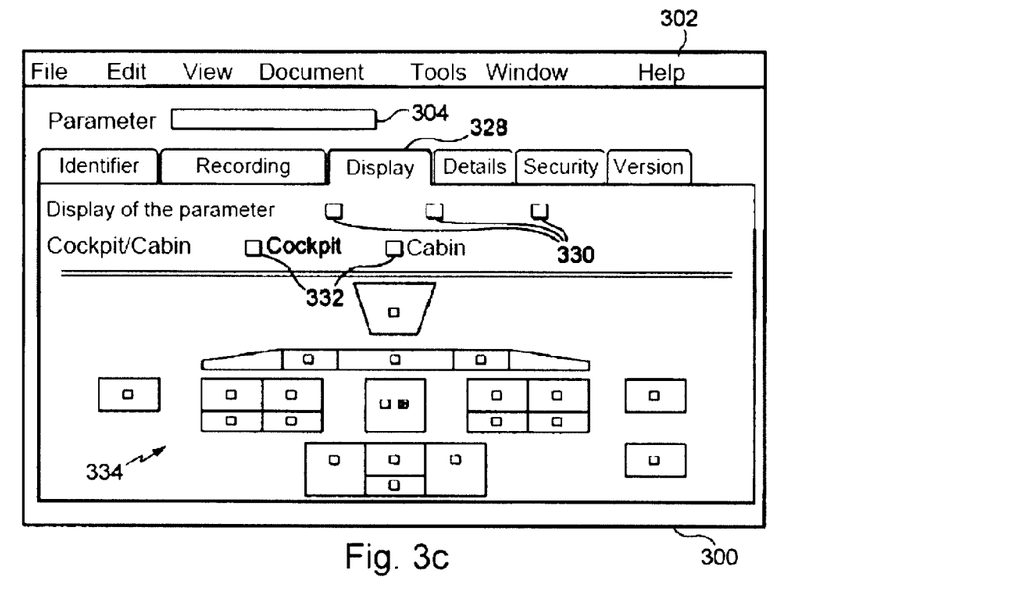

FIG. 3*c* shows a graphical interface for consulting or editing display information items for the parameter. These information items are grouped under tab 328.

Tab 328 concerning display information items comprises several fields that can be edited, including, an information item 330 indicating whether or not the parameter is displayed and, if need be, the conditions under which it is displayed (a pop-up type menu can be used to display these conditions such as the logics of displays or a link to referenced files/tools containing these information items);

an indication 332 of general nature for specifying whether the parameter is displayed in the cockpit and/or in the cabin; and, a more detailed indication 334 specifying on which screen or which screens of the display system of the cockpit and/or of the cabin the parameter is displayed or can be displayed. This indication can be shown in the form of one or more diagrams representing the display screens of the cockpit and of the cabin and of a navigation system making it possible to navigate among the different pages of these screens in order to reach the page or pages on which the parameter is displayed or can be displayed. These pages can contain one or more complementary fields, according to the parameter concerned, to allow a more precise description.

The navigation system can comprise navigation buttons 336 enabling the opening of new windows and facilitating navigation to the desired information item or expansion and contraction (zoom) buttons for an easier consultation.

Figure 3D:
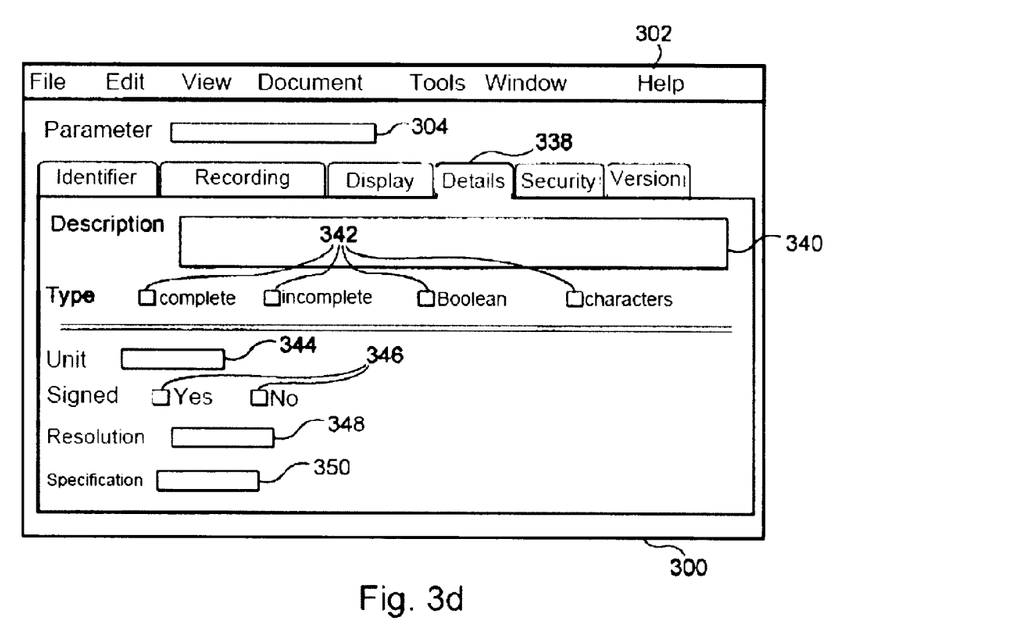

FIG. 3*d* illustrates an example of a graphical interface for consulting or editing detailed information items concerning the parameter. These details are grouped under tab 338.

Tab 338 here comprises several fields that can be edited, including, a more or less detailed description 340 of the parameter;

the type 342 of the parameter (for example complete, real, Boolean or character chain);

the unit of value 344 for the measurement parameters (for example Kg, m/s or bar);

the sign indication 346 for the digital values of the parameter;

the resolution 348 of the parameter as well as the operating value range of the parameter (not shown);

the specification 350 of the parameter;

the description of the true and false states for parameters of Boolean type; and other pertinent information items depending on the parameter concerned.

The detailed complementary information items can be shown in the form of one or more pages and of diagrams representing the different receiving computers for the parameter as well as the detail of the format and of the structure of the data (for example the detailed description of the ARINC429 label including the details of the bits used) and the sign conventions used.

Figure 3E:
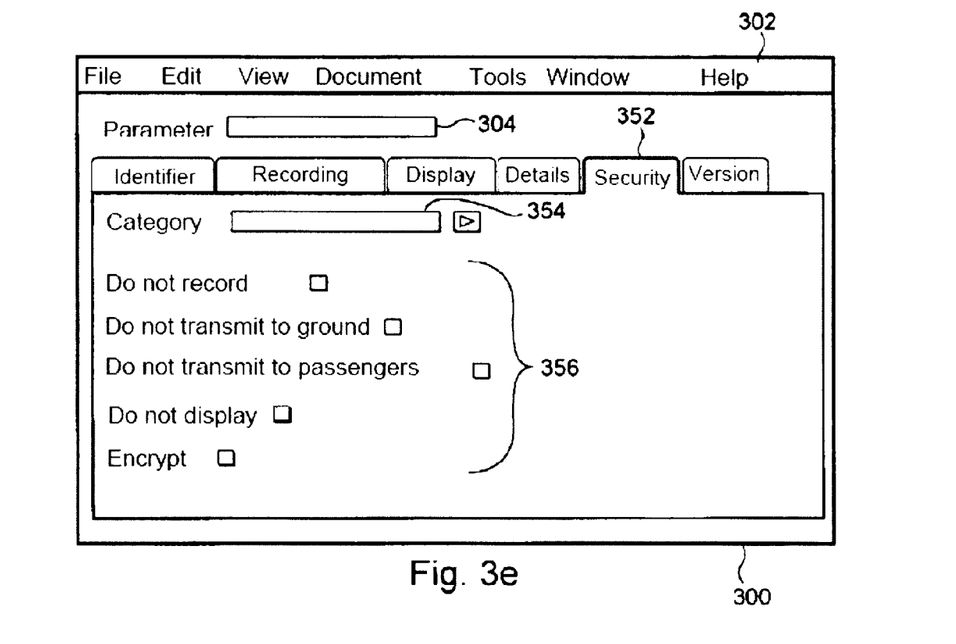

FIG. 3*e* illustrates an example of a graphical interface for consulting or editing security information items linked to the edited parameter of tab 352.

Tab 352 here comprises several fields including, an indication of the security level 354 of the parameter (the security level is chosen, for example, in a pop-up type menu); and the list 356 of authorized display, recording, transmission operations, as well as the indication of encryption of the parameter.

The tab also can contain complementary information items specifying, for example, whether it involves a parameter specific to in-flight (EV) or maintenance trials.

Figure 3F:
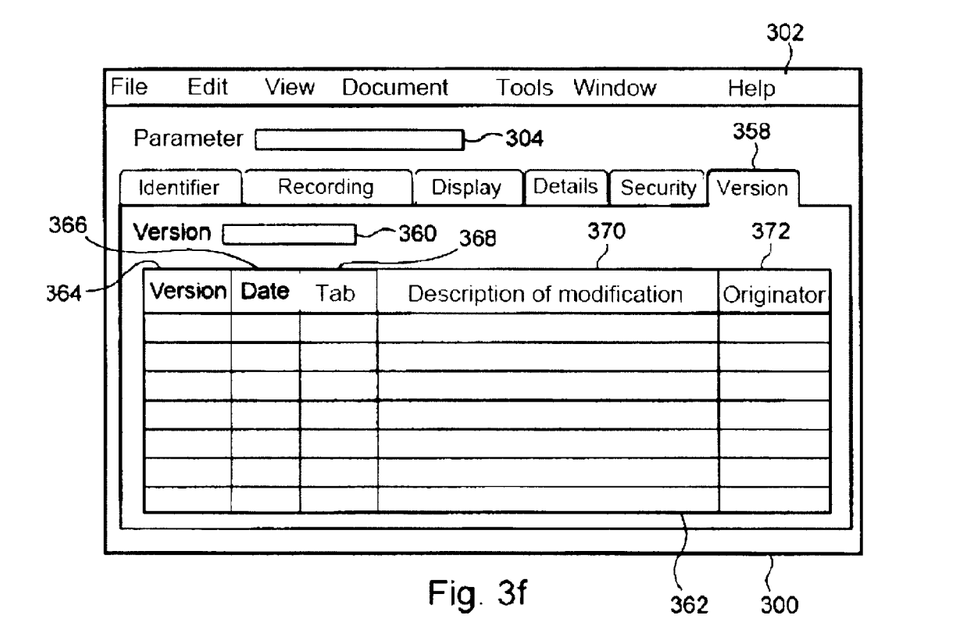

Finally, FIG. 3*f* shows an example of a graphical interface for presenting version data linked to the information items for the parameter. These data, grouped under tab 358, here cannot be edited.

Tab 358 here comprises an indication of the current version 360 of the card for identification of the parameter as well as a table summarizing the modifications made to this identification card. In this example, the line number of table 362 corresponds to the number of modifications made to the identification card. Each line preferably comprises the following information items, the version 364 of the modified identification card;

the date 366 of the modification;

the reference 368 of the modified tab;

a brief description 370 of the modification made; and, the name 372 of the originator of the modification.

The information items linked to an identification card such as presented on FIG. 3 are used to determine an identification code and the set of information items characteristic of the parameter. These information items are stored in memory in the form of identification cards in a database making it possible in particular to perform search, sorting and selection operations.

Figure 4:
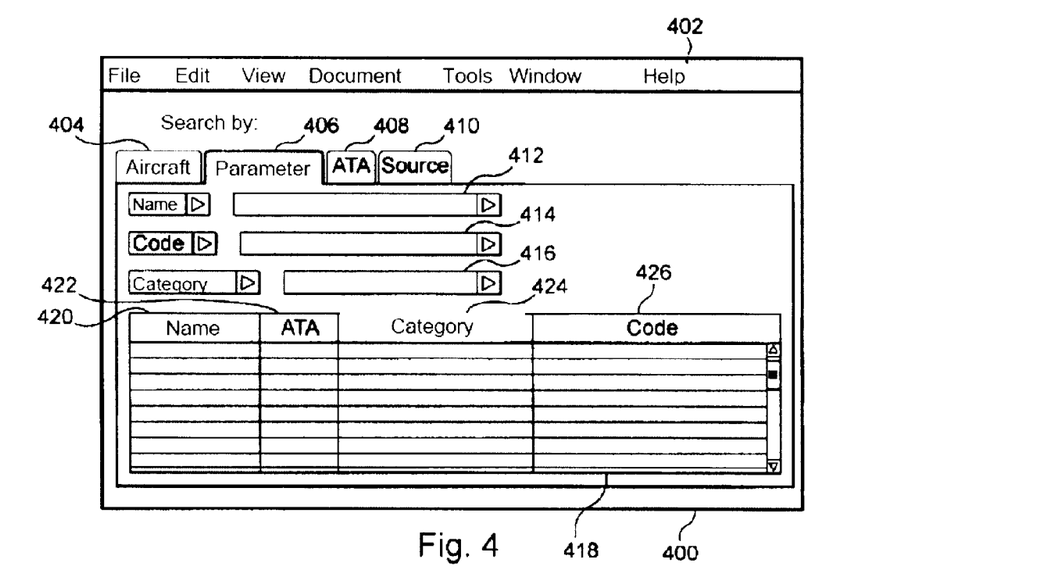
FIG. 4 illustrates an example of a graphical interface used to search for, sort or select information items relating to a parameter; and, FIG. 5 illustrates an example of a device used to control the data of the cards for identification of parameters.

FIG. 4 illustrates an example of a graphical interface 400 making it possible to use functions of search and access to information items relating to avionic parameters. Graphical interface 400 here comprises a standard menu 402, similar to menu 302.

The search for information items relating to a parameter can be performed according to several criteria. In this example, the main search criteria are grouped in the form of tabs. Tab 404 corresponding to a search by aircraft, tab 406 corresponds to a search by parameter, tab 408 corresponds to a search by ATA reference and tab 410 corresponds to a search by equipment at the origin of the parameters. The example presented on FIG. 4 illustrates a search by parameter.

Tab 406 comprises fields 412, 414 and 416 making it possible to define the search criteria and a table 418 presenting a synthesis of the results. Search fields 412, 414 and 416 make it possible to determine the nature of the information items on which the search is to be performed as well as the search values. These choices preferably are entered with the aid of pull-down and/or pop-up type menus. In the example illustrated, searches are performed with the aid of the name of the parameter (field 412), the code of the parameter (field 414) and/or the category (field 416).

The result of the search preferably is displayed in the form of a table 418 in which each line corresponds to a result. Each result here comprises the name 420, the ATA reference 422, the category 424 and the code for identification 426 of the parameter. The window for display of the results preferably can be defined by the user according to his needs.

In order to protect the data contained in the cards for identification of the parameters, a control system advantageously is implemented by the database at the time of access to these data. Such a control consists, for example, in controlling the rights of the seeker such as generally used by databases.

Moreover, as indicated above, the use of an identification code such as defined by reference to FIG. 2 makes it possible to verify certain information items relating to the parameter, in particular the origin or the level of confidentiality of the value of the parameter. An initial verification is performed by the device receiving these data, while a second verification is performed by a monitoring device.

Figure 5:
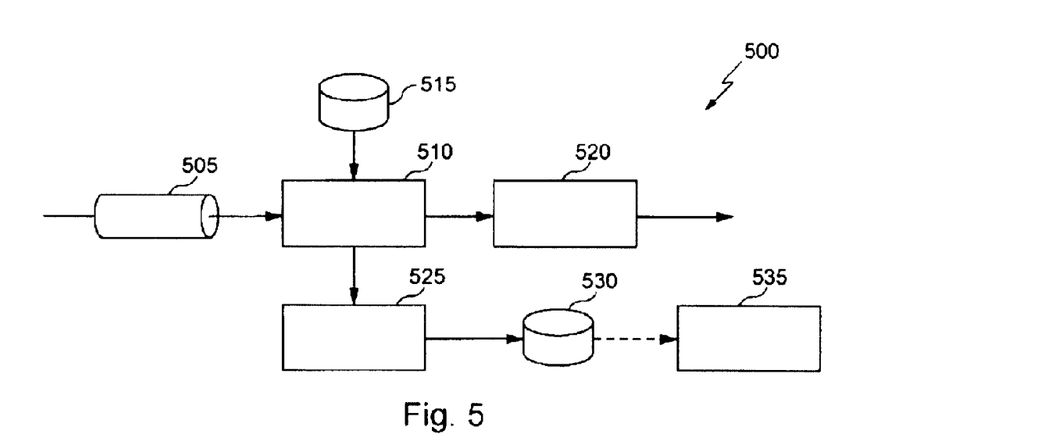

FIG. 5 illustrates an example of the device 500 used for verifying the values associated with a parameter with the aid of the code for identification of the parameter. When a frame 505 containing one or more values as well as an identification code 200 is received by device 500 via a network (not shown), module 510 identifies the field of frame 505 according to the format and the references used, stored in memory in memory means 515. Module 510 advantageously comprises means for syntactic analysis (also called parser in English terminology). Memory means 515 can be local, that is, belong to device 500, or deported and accessible via the network, for example linked to the database for the cards for identification of the parameters. Memory means 515 comprise a description of the coding for the identification codes.

Each field identified in frame 505 is analyzed and the coherence of the data is verified according to the format and the references stored in memory in 515. By way of illustration, the coherence of the data can be obtained by comparing the nature of the parameter or the corresponding ATA reference with the source of the parameter. In this way, an air conditioning parameter deriving from a navigation computer would be considered as incoherent.

It should be recalled here that certain data can be encrypted. Device 500 advantageously can decrypt these data only if so authorized, that is, if it has the corresponding decryption key.

If the data are coherent and if device 500 has the right to use them, that is, if module 510 is able to decrypt the encrypted data, the information items derived from the fields of frame 505 are transmitted to module 520 to be used. Module 520 can be, for example, a display module, a calculation module or a module used for statistical purposes.

If the data are not coherent or if device 500 does not have the right to use them, frame 505 is not transmitted to module 520. Frame 505 also is erased from module 510 if it has been stored therein.

At the same time, a monitoring module 525 controls the analysis performed by module 510 on frame 505 and transmits an indication of this control to memory means 530. The control in particular has as an object to determine the status of the analysis of frame 505 and to transmit information items relating to the identity of the parameter affected by frame 505, to the coherence of the data and to the rights of module 510 to decode these data.

The information items stored in memory in 530 are analyzed by a security control module 535 that performs in particular a statistical analysis of these data in order to make it possible to identify network security flaws, attempts at unjustified access to certain parameters and more generally to control the reliability, in terms of security, of the network over which the cards for identification of the parameters are traveling. Security control module 535 generates alarms if a problem is detected.

In complementary or alternative manner, these alarms can be generated by monitoring module 525.

A sole module 535 advantageously is used to control the exchange of information cards for the parameters over a network.

Naturally, in order to satisfy specific needs, an individual competent in the area of the invention will be able to apply modifications in the foregoing description. In particular, although the invention has been more specifically presented in the area of aircraft, it should be noted that, more generally, it can be implemented in the area of aerodynamic vehicles such as spacecraft and ships.

The invention claimed is:

1. A method for management of at least one characteristic of at least one parameter in a plurality of parameters that are used for exchanging information between components on board an aerodynamic vehicle, the method comprising:
   receiving a parameter identifier that identifies the at least one parameter that is used for exchanging the information between the components on board the aerodynamic vehicle;
   receiving the at least one characteristic of the at least one parameter, the at least one characteristic includes an origin identifier that identifies one of the components on board the aerodynamic vehicle that transmits the at least one parameter to one or more other of the components on board the aerodynamic vehicle;
   formulating the at least one characteristic of the at least one parameter, including the origin identifier, according to a predetermined format;
   creating, using a processor, a code that uniquely identifies the at least one parameter out of the plurality of parameters, the created code comprising a plurality of fields, a first field in the created code including the received parameter identifier that identifies the at least one parameter and a second field in the created code including the at least one formulated characteristic that includes the origin identifier that identifies the one of the components on board the aerodynamic vehicle that transmits the at least one parameter to the one or more other of the components on board the aerodynamic vehicle;

storing, together on a same identification card in a centralized database, a name of the at least one parameter, the created code that uniquely identifies the at least one parameter, and at least one complementary information item descriptive of the at least one parameter; and accessing the centralized database by plural users.

2. The method according to claim 1, further comprising:
receiving the at least one complementary information item descriptive of the at least one parameter; and
associating the at least one complementary descriptive information item with the identification code.

3. The method according to claim 1, wherein the at least one characteristic of the at least one parameter further comprises information items relating to at least one of an indication of whether the at least one parameter is displayed on a screen in the aircraft, and a level of confidentiality of values of the at least one parameter.

4. The method according to claim 1, further comprising:
processing at least one value of the at least one parameter used on board the aerodynamic vehicle, the processing including
receiving the code for identification of the at least one parameter,
receiving the at least one value associated with the at least one parameter,
verifying the data of the identification code received according to predetermined reference data, and
responsive to the data of the identification code received being verified, processing the at least one value received.

5. The method according to claim 4, further comprising:
transmitting an information item relating to the at least one parameter responsive to the data of the identification code received not being verified.

6. The method according to claim 5, further comprising:
controlling the at least one parameter used on board an aerodynamic vehicle, the controlling including
receiving at least one information item relating to the at least one parameter, the information item being transmitted by the processing the at least one value of the at least one parameter; and
generating an alarm.

7. The method according to claim 1, wherein the at least one characteristic includes a range of operational values of the at least one parameter, a resolution of the at least one parameter, an accuracy of the at least one parameter, or a unit of measure of the at least one parameter.

8. The method according to claim 7, wherein the at least one characteristic identifies the parameter as a flight management parameter, an engine parameter, or a performance parameter.

9. The method according to claim 7, wherein the at least one characteristic identifies the parameter as a speed parameter, a temperature parameter, a weight parameter, or a frequency parameter.

10. The method according to claim 1, wherein the at least one characteristic includes an indication of whether the at least one parameter is recorded by a flight recorder.

11. The method according to claim 10, wherein the at least one characteristic includes an indication of whether the at least one parameter is a mandatory parameter for which recording derives from a prescribed requirement on the part of a competent authority, or is a documentary parameter for which recording is not specifically required by the competent authority.

12. The method according to claim 1, wherein the parameter includes an avionics parameter transmitted and received by at least one of a navigation system on board the aerodynamic vehicle, a piloting system on board the aerodynamic vehicle, a flight management system on board the aerodynamic vehicle, or a control system on board the aerodynamic vehicle.

13. The method according to claim 1, further comprising:
accessing the centralized database by plural users simultaneously, the database being available twenty-four hours a day, seven days a week, and the plural users including systems designers, testers, quality engineers, customer-support engineers, specialists in certification, specialists in incident/accident investigations, and maintenance operators.

14. The method according to claim 1, further comprising:
storing in the centralized database a plurality of identification cards each corresponding to a different parameter and each including a unique code for identification of the different parameter and at least one corresponding characteristic of the different parameter; and
executing an application program on a computer to create a dynamic link between at least two of the plurality of identification cards stored in the centralized database.

15. The method according to claim 1, wherein:
the plurality of fields further include
    a standard identifier field constituting a first level of identification of the at least one parameter to generally identify the parameter with a minimum of data,
    a detailed identifier field constituting a second level of identification of the at least one parameter to precisely identify the at least one parameter,
    a recording field indicating whether or not the at least one parameter is recorded in a flight recorder,
    a display field indicating whether or not the at least one parameter is displayed in the aircraft, and identifying a screen in the aircraft to display the at least one parameter,
    a security field indicating whether or not the parameter is confidential or can be exported, and
    a version field to manage changes,
wherein each of the plurality of fields has a set, predetermined length, and is composed of figures and alphanumeric characters.

16. The method according to claim 15, wherein the following fields each include a character to identify a field type:
the standard identifier field includes the 'P' character;
the recording field includes the 'R' character;
the display field includes the 'D' character;
the security field includes the 'S' character; and
the version field includes the 'V' character.

17. A management device that manages at least one characteristic of at least one parameter in a plurality of parameters that are used for exchanging information between components on board an aerodynamic vehicle, the device comprising:
a receiver that receives a parameter identifier that identifies the at least one parameter that is used for exchanging the information between the components on board the aerodynamic vehicle and receives the at least one characteristic of the at least one parameter, the at least one characteristic includes an origin identifier that identifies one of the components on board the aerodynamic vehicle that transmits the at least one parameter to one or more other of the components on board the aerodynamic vehicle;

a processor configured to formulate the at least one characteristic of the at least one parameter, including the origin identifier, according to a predetermined format, and create a code that uniquely identifies the at least one parameter out of the plurality of parameters, the created code comprising a plurality of fields, a first field of the created code including the identifier of the at least one parameter and a second field of the created code including the at least one formulated characteristic that includes the origin identifier that identifies the one of the components on board the aerodynamic vehicle that transmits the at least one parameter to the one or more other of the components on board the aerodynamic vehicle; and a centralized database accessible by plural users that stores, together on a same identification card, a name of the at least one parameter, the created code that uniquely identifies the at least one parameter, and at least one complementary information item descriptive of the at least one parameter.

18. The device according to claim 17, wherein the device is integrated into an aircraft.

19. The device according to claim 17, wherein the at least one characteristic includes a range of operational values of the at least one parameter, a resolution of the at least one parameter, an accuracy of the at least one parameter, or a unit of measure of the at least one parameter.

20. The device according to claim 19, wherein the at least one characteristic identifies the parameter as a flight management parameter, an engine parameter, or a performance parameter type.

21. The device according to claim 19, wherein the at least one characteristic identifies the parameter as a speed parameter, a temperature parameter, a weight parameter, or a frequency parameter.

22. The device according to claim 17, wherein the at least one characteristic includes an indication of whether the at least one parameter is recorded by a flight recorder.

23. The device according to claim 22, wherein the at least one characteristic includes an indication of whether the at least one parameter is a mandatory parameter for which recording derives from a prescribed requirement on the part of a competent authority, or is a documentary parameter for which recording is not specifically required by the competent authority.

24. The device according to claim 17, wherein the parameter includes an avionics parameter transmitted and received by at least one of a navigation system on board the aerodynamic vehicle, a piloting system on board the aerodynamic vehicle, a flight management system on board the aerodynamic vehicle, or a control system on board the aerodynamic vehicle.

25. The device according to claim 17, wherein the centralized database is configured to be accessed by plural users simultaneously, the database being available twenty-four hours a day, seven days a week, and the plural users including systems designers, testers, quality engineers, customer-support engineers, specialists in certification, specialists in incident/accident investigations, and maintenance operators.

26. The device according to claim 17, wherein:
the plurality of fields further include
a standard identifier field constituting a first level of identification of the at least one parameter to generally identify the parameter with a minimum of data,
a detailed identifier field constituting a second level of identification of the at least one parameter to precisely identify the at least one parameter,
a recording field indicating whether or not the at least one parameter is recorded in a flight recorder,
a display field indicating whether or not the at least one parameter is displayed in the aircraft, and identifying a screen in the aircraft to display the at least one parameter,
a security field indicating whether or not the parameter is confidential or can be exported, and
a version field to manage changes,
wherein each of the plurality of fields has a set, predetermined length, and is composed of figures and alphanumeric characters.

27. The device according to claim 26, wherein the following fields each include a character to identify a field type:
the standard identifier field includes the 'P' character;
the recording field includes the 'R' character;
the display field includes the 'D' character;
the security field includes the 'S' character; and
the version field includes the 'V' character.

28. A non-transitory computer readable medium including computer executable instructions that when executed by a processor performs a method for management of at least one characteristic of at least one parameter in a plurality of parameters that are used for exchanging information between components on board an aerodynamic vehicle, the method comprising:

receiving a parameter identifier that identifies the at least one parameter that is used for exchanging the information between the components on board the aerodynamic vehicle;

receiving the at least one characteristic of the at least one parameter, the at least one characteristic includes an origin identifier that identifies one of the components on board the aerodynamic vehicle that transmits the at least one parameter to one or more other of the components on board the aerodynamic vehicle;

formulating the at least one characteristic of the at least one parameter, including the origin identifier, according to a predetermined format;

creating a code that uniquely identifies the at least one parameter out of the plurality of parameters, the created code comprising a plurality of fields, a first field of the created code including the identifier of the at least one parameter and a second field of the created code including the at least one formulated characteristic that includes the origin identifier that identifies the one of the components on board the aerodynamic vehicle that transmits the at least one parameter to the one or more other of the components on board the aerodynamic vehicle;

storing, together on a same identification card in a centralized database, a name of the at least one parameter, the created code that uniquely identifies the at least one parameter, and at least one complementary information item descriptive of the at least one parameter; and accessing the centralized database by plural users.

29. The computer readable medium according to claim 28, wherein the at least one characteristic includes a range of operational values of the at least one parameter, a resolution of the at least one parameter, an accuracy of the at least one parameter, or a unit of measure of the at least one parameter.

30. The computer readable medium according to claim 29, wherein the at least one characteristic identifies the parameter as a flight management parameter, an engine parameter, or a performance parameter type.

31. The computer readable medium according to claim 29, wherein the at least one characteristic identifies the parameter as a speed parameter, a temperature parameter, a weight parameter, or a frequency parameter.

32. The computer readable medium according to claim 28, wherein the at least one characteristic includes an indication of whether the at least one parameter is recorded by a flight recorder.

33. The computer readable medium according to claim 32, wherein the at least one characteristic includes an indication of whether the at least one parameter is a mandatory parameter for which recording derives from a prescribed requirement on the part of a competent authority, or is a documentary parameter for which recording is not specifically required by the competent authority.

34. The computer readable medium according to claim 28, wherein the parameter includes an avionics parameter used transmitted and received by at least one of a navigation system on board the aerodynamic vehicle, a piloting system on board the aerodynamic vehicle, a flight management system on board the aerodynamic vehicle, a communication system, a maintenance system, a recording system, or a control system on board the aerodynamic vehicle, a display system, or a ground system.

35. The computer readable medium according to claim 28, the method further comprising:
    accessing the centralized database by plural users simultaneously, the database being available twenty-four hours a day, seven days a week, and the plural users including systems designers, testers, quality engineers, customer-support engineers, specialists in certification, specialists in incident/accident investigations, and maintenance operators.

36. The computer readable medium according to claim 28, the method further comprising:
    storing in the centralized database a plurality of identification cards each corresponding to a different parameter and each including a unique code for identification of the different parameter and at least one corresponding characteristic of the different parameter; and
    executing an application program on a computer to create a dynamic link between at least two of the plurality of identification cards stored in the centralized database.

37. The computer readable medium according to claim 28, wherein:
    the plurality of fields further include
        a standard identifier field constituting a first level of identification of the at least one parameter to generally identify the parameter with a minimum of data,
        a detailed identifier field constituting a second level of identification of the at least one parameter to precisely identify the at least one parameter,
        a recording field indicating whether or not the at least one parameter is recorded in a flight recorder,
        a display field indicating whether or not the at least one parameter is displayed in the aircraft, and identifying a screen in the aircraft to display the at least one parameter,
        a security field indicating whether or not the parameter is confidential or can be exported, and
        a version field to manage changes,
    wherein each of the plurality of fields has a set, predetermined length, and is composed of figures and alphanumeric characters.

38. The computer readable medium according to claim 37, wherein the following fields each include a character to identify a field type, as follows:
    the standard identifier field includes the 'P' character;
    the recording field includes the 'R' character;
    the display field includes the 'D' character;
    the security field includes the 'S' character; and
    the version field includes the 'V' character.

* * * * *